Dec. 29, 1959  B. W. OSWALT  2,918,797
HYDRAULIC AUTOMATIC ADJUSTING MECHANISM
Filed Oct. 28, 1957

INVENTOR.
BURLIN W. OSWALT
BY
J.D. Haney
ATTY.

United States Patent Office 2,918,797
Patented Dec. 29, 1959

2,918,797

HYDRAULIC AUTOMATIC ADJUSTING MECHANISM

Burlin W. Oswalt, Union, Ohio, assignor to The B. F. Goodrich Company, New York, N.Y., a corporation of New York Application October 28, 1957, Serial No. 692,636

3 Claims. (Cl. 60—54.5)

This invention relates to improvements in mechanisms for automatically adjusting hydraulic brakes to maintain a uniform release clearance between the engageable braking members and thereby provide a uniform pedal action for a braking system. The mechanism of this invention functions to effect such an adjustment by automatically metering hydraulic fluid to or from the hydraulic motor of a brake during successive actuations of the brake. Although the mechanism has special utility for brakes, it may be used advantageously for regulating hydraulic motors in environments other than brakes where service conditions are similar to brakes.

The mechanism of this invention is a two-way adjuster. That is to say, it is adapted to compensate both for wear of the brake linings and also for changes in the release clearance brought about by abnormal thermal expansion of the braking members, and resilient deflection of the braking members when the brake is engaged. The mechanism operates satisfactorily for both drum or disc-type brakes and is suitable for automotive brakes as well as for high energy aircraft brakes. The mechanism is also suitable for use with piston-type hydraulic motors and with diaphragm or expansible tube-type hydraulic motors.

The present invention is directed particularly to improvements in a mechanism for this same purpose disclosed and claimed in my copending application Serial No. 459,374, filed September 30, 1954, now Pat. No. 2,835,111. The improved features of the mechanism of the instant application provide for exceptional accuracy and sensitivity in regulating a hydraulic motor.

The accompanying drawings show two preferred forms of the improved adjusting mechanism embodying the present invention, as they may be incorporated into a braking system. In the drawings.

Figure 1:
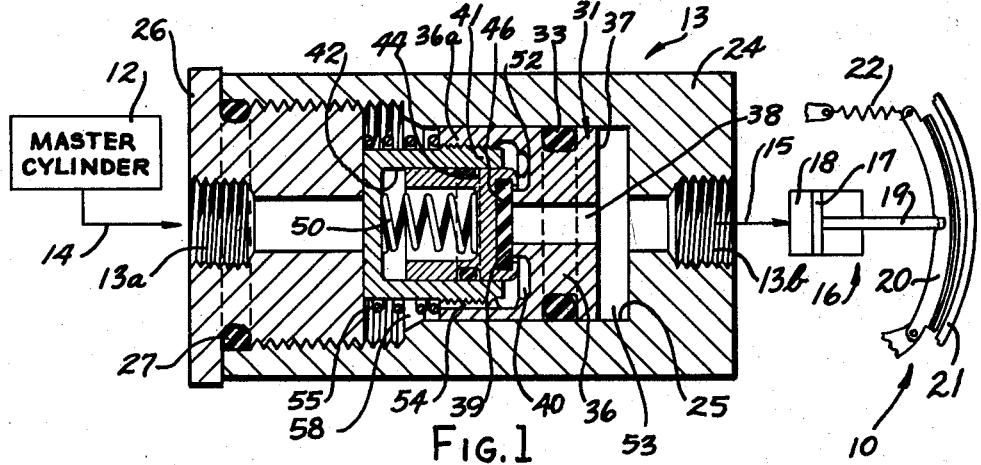
Fig. 1 shows an axial cross-sectional view of an improved adjusting mechanism together with a brake system which is represented schematically; the adjusting mechanism is shown in its condition when the brake is disengaged.
Figure 2:
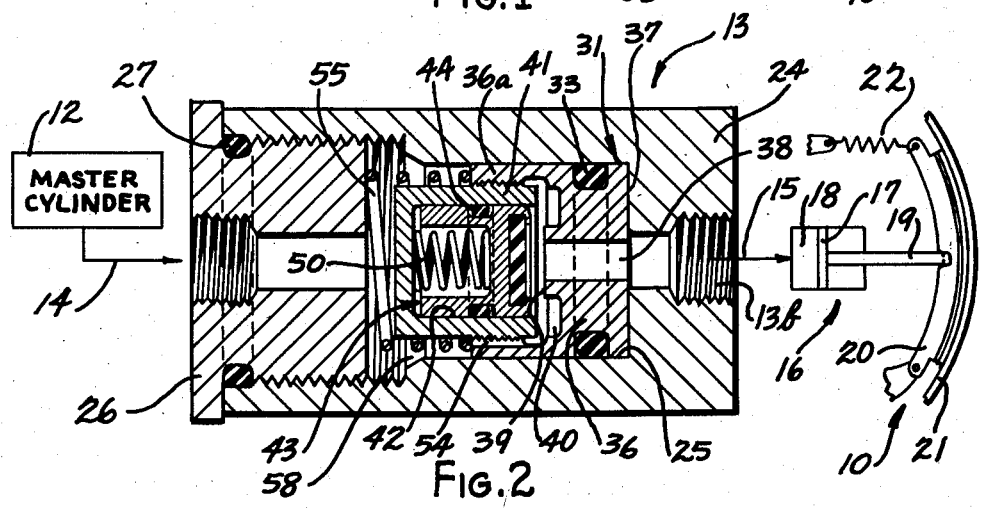
Fig. 2 is a view similar to Fig. 1 but showing the condition of the adjusting mechanism when the brake is engaged.

Referring to the drawings, the braking system schematically represented in Figs. 1–2 includes a brake 10 operated by a master cylinder 12 which may be energized by a conventional foot pedal (not shown). An adjusting mechanism 13 according to this invention is connected into this system between the master cylinder and the brake. A pipe 14 leading from master cylinder 12 is attached to an inlet connection 13a of the adjuster mechanism. The opposite or outlet end 13b of the adjuster is connected to a pipe 15 leading to the brake motor 16 consisting of a piston 17 slidable in a cylinder 18. Piston 17 of the brake motor is connected through a rod 19 to a brake shoe 20 engageable with a brake drum 21 against the opposition of a retractor spring 22. Pipes 14 and 15 from the master cylinder to the brake motor are entirely filled with hydraulic fluid and the force exerted on this fluid by the master cylinder to operate the brake motor is transmitted through the adjusting mechanism 13.

The adjusting mechanism 13 comprises a cup-shaped outer casing 24 having a central axial internal cylinder 25 which is closed by an end cap 26 threaded securely into the open end of the casing against an annular gasket 27. Housed within cylinder 25 is a piston assembly 31 which is adapted for axial reciprocation in the cylinder 25 and which is sealed slidably against the wall of cylinder 25 by an O-ring 33.

Piston assembly 31 includes a piston 36 having a forward pressure face 37 directed toward outlet 13b and having a skirt portion 36a directed toward inlet 13a. An axial port 38 leads from forward pressure face 37 into the interior of piston 36. Surrounding the mouth of port 38 inside piston 36 is an annular valve seat 39 which in turn is encircled by an annular groove 40 in piston 36. A cup-shaped tubular housing 41 is threaded tightly into the skirt portion 36a on piston 36 to close the open end of piston 36. On the interior of housing 41 there is a bore 42 axial with port 38 in which bore there is a pressure-sensing valve 43. The pressure-sensing valve 43 is sealed slidably against the wall of bore 42 by an O-ring 44, and is biased toward a seated position on seat 39 by a valve spring 50 inside housing 41. Valve 43 is generally cup-shaped and is disposed in housing 41 with its open end directed toward the closed end of housing 41 and so that valve spring 50 fits inside valve 43. The end surface of the cylindrical walls of valve 43 are adapted to engage the closed end wall of housing 41 when the valve is fully opened.

The central region of the forward face of pressure-sensing valve 43 is recessed to receive a resilient rubber sealing disc 46 which engages seat 39 when the valve is closed. The sealing disc 46 is preferably fastened to valve 43 by rolling the margins 52 of the front face of the valve about the periphery of the disc. In the closed position of valve 43, the inwardly rolled margins 52 of the forward face of valve 43 are in communication with fluid in annular groove 40 in the piston 36 and these margins 52 form an annular hydraulic actuating surface for valve 43 which surface is responsive to a predetermined pressure of fluid in groove 40 to force the valve open. As hereinafter explained more fully, groove 40 is supplied with fluid from the inlet 13a by a passage 54 through the threaded connection between closure 41 and skirt portion 36a of piston 36.

During periods when the brake 10 is disengaged as is the situation depicted in Fig. 1, the floating piston assembly 31 is lodged in the left end of casing 24 with housing 41 abutting the end cap 26 of the casing and with pressure-sensing valve 43 closed tightly on seat 39. In this leftward position of piston assembly 31, the forward face 37 of the piston 36 (including port 38) defines with cylinder 25 an outlet chamber 53 inside casing 24 which chamber is entirely filled with hydraulic fluid. Additionally pipe 15 and brake motor 16 are entirely filled with fluid. The volume of fluid in outlet chamber 53 is isolated ahead of the floating piston assembly 31 by the ring seal 33 about piston 36 and the closed pressure-sensing valve 43. This volume together with the fluid in pipe 15 and motor 16 is hereinafter called the "fluid link" of the system.

The floating piston assembly 31 is biased rightward so that its forward face 37 acts against this fluid link by a main spring 55 inside casing 24 which spring is under compression between end cap 26 and the piston 36. The biasing force exerted by spring 55 against the floating piston assembly 31 is less than the counter force exerted on the piston assembly 31 through the fluid link by the brake retractor springs 22 of the brake. Accordingly, the piston assembly 31 is maintained in its leftward position as in Fig. 1 by the retractor springs 22 of the brake while the brake is disengaged.

The spaces inside the casing 24 between the left end of the piston assembly 31 and the end cap 26 define an inlet chamber 58 which is entirely filled with hydraulic fluid delivered into the casing through the inlet 13a from pipe 14. This inlet actuating fluid, as previously noted, also fills passage 54 and the annular groove 40 inside piston 36 so that the annular marginal actuating surface 52 of the pressure-sensing valve 43 is exposed to fluid from the inlet chamber when valve 43 is closed. The fluid of the inlet chamber 58 is isolated from the fluid of the fluid link by the sealing engagement of the rubber disc 46 against seat 39, and also by the main O-ring seal 33 around piston 36.

The space inside bore 42 behind pressure-sensing valve 43 in which the valve spring 50 is housed is void of hydraulic fluid and is maintained closed to fluid in either the inlet or the outlet chambers. The fluid in groove 40 is prevented from passing into bore 42 behind the valve 43 by the ring seal 44 around valve 43. It is important to maintain the space behind valve 43 free of hydraulic fluid to avoid impeding the reciprocating movement of the pressure-sensing valve 43 in bore 42 as valve 43 opens and closes on seat 39.

When the brake system is pressurized by the master cylinder, the piston assembly 31 is moved bodily rightward against the "fluid link" and against the counter force of the brake retractor springs thereby displacing the fluid link toward brake motor 16; whereas on release of pressure of the master cylinder, the piston assembly 31 is returned to its leftward position of Fig. 1 by the force exerted by the retractor springs of the brake acting against the fluid link through the brake motor. The pressure-sensing valve 43 is usually closed during rightward actuated movement of the assembly 31, and is always closed during the return movement of the assembly 31.

The adjusting mechanism is preferably designed so that the volume of fluid in its outlet chamber 53 is substantially equal to the volume of fluid required to operate the brake motor to engage the shoes with the drum when there is a predetermined release clearance between the shoe and the drum. Thus if the brake shoe 20 is initially spaced from the drum 21 at the uniform or standard clearance desired when the brake system is pressurized, then the floating piston assembly 31 will "bottom" in casing 24 as in Fig. 2 at substantially the same time the shoe 20 firmly engages the drum. As soon as, or close to the time piston 36 bottoms in casing 24, the pressure of the inlet hydraulic fluid will reach the full rated pressure of the master cylinder 12. Then the full system pressure is transmitted through passage 54 and groove 40 to act against annular marginal surface 52 of valve 43 and thus force open valve 43. Ordinarily, there will be little or no flow of inlet fluid across seat 39 into port 38 immediately after the opening of valve 43 because the pressure in the fluid link will then equal the pressure of the fluid in the inlet chamber 58 of the mechanism 13. Throughout a period in which the brake is engaged, the pressure-sensing valve 43 stands open so that the master cylinder 12 is in direct communication with the brake motor 16 via the fluid in pipe 14, inlet chamber 58, passage 54, groove 40, port 38, outlet 13b, and pipe 15.

If the brake is released before there is any substantial wear on the linings or distortion of the brake members, valve 43 snaps shut immediately upon release of the hydraulic pressure to isolate the fluid link from the inlet fluid during the return stroke of the floating piston assembly. Then as the brake shoe is retracted by springs 22 the floating piston assembly 31 is returned to its position of Fig. 1 of the drawings with the volume of fluid in the fluid link unchanged.

If, however, during the period in which the brake is engaged there is wear occurring in the brake linings and/or any expansion of the brake drum, such conditions tend to relieve pressure of the fluid link and therefore there results a corresponding flow of fluid from the inlet side of piston 36 through port 38 into the link until full line pressure is restored in the fluid link. The volume of the fluid link is progressively increased in this manner and the brake shoes are thereby stepped forward against the drum to compensate for the wear and/or expansion occurring during a braking operation. The fluid added to the fluid link through port 38 to compensate for wear or expansion is trapped in the fluid link by the closing of valve 43 as soon as the brake is released. Then, when the floating piston assembly is retracted to its leftward position of Fig. 1 when the brake is released, the added volume of fluid trapped in the fluid link relocates the release position of the brake shoe 20 relative to the brake drum to maintain the desired predetermined release clearance.

In cases where the drum undergoes substantial thermal expansion, the brake shoe is adjusted outwardly so that it will remain in firm engagement with the drum throughout the period the brake is applied, and when the brake is released the brake shoe will be retracted the usual uniform distance from the drum. The subsequent cooling of the brake drum, however, will materially reduce this release clearance and under some conditions the contraction will be of sufficient magnitude to cause the drum to exert intense constricting force on the brake shoe.

In the event the drum shrinks enough to exert such force on the brake shoe 20 in the system shown in Figs. 1 and 2, such force will produce a corresponding increase in pressure in the fluid link which will act through port 38 against the valve 43 and eventually force open valve 43. This allows some of the fluid in the fluid link to bleed off through port 38 and through passage 54 into the inlet chamber 58 until pressure in the fluid link is relieved and the brake shoe is in light dragging contact with the brake drum. These events occur while the piston assembly is in its rightward position in Fig. 1 and this flow can occur because the fluid in the inlet chamber 58 under these circumstances is at the back pressure of the braking system, usually atmospheric pressure.

Whether the shrinkage of the drum after release merely brings about a slight reduction in the release clearance, or whether it is such as to result in a constricting force on the brake shoes to force open valve 43 described in the next preceding paragraph, the desired release clearance between the brake shoes and the brake drum may be automatically restored by merely depressing the brake pedal momentarily after the brake members have cooled to ambient temperature and resumed their normal locations.

When the brake pedal is depressed to re-set the release clearance, the piston assembly 31 is displaced forwardly until the brake shoe is firmly engaged with the drum in the manner explained previously. However, since the release clearance existing when the pedal is depressed under these circumstances is much less than the normal release clearance, the shoes will be firmly pressed against the brake drum substantially before the floating piston assembly 31 reaches its bottomed or actuated position shown in Fig. 2. But as soon as the shoes are engaged, regardless of the particular axial position of piston assembly 31 in casing 24, the valve 43 is forced open to uncover port 38 by the pressure exerted against the peripheral marginal surface 52 of valve 43 by the inlet fluid. Thereafter, although the pressure of the fluid acting against the opposing sides of floating piston assembly 31 is balanced and the opposing surface areas of the floating piston assembly are equal, the piston assembly 31 is moved translationally rightward through the fluid link by the force exerted on it by main spring 55 until the piston 36 is bottomed in casing 24 as shown in Fig. 2. During this movement the volume of the fluid link is reduced by the amount of fluid spilling backward through port 38 while the piston assembly is advanced by spring 55. Thereafter, as soon as the pedal or master cylinder pressure is released, valve 43 instantly snaps shut and the piston assembly 31 retracts to its position shown in Fig. 1 so that the desired release clearance is restored between the brake shoes and the brake drum.

In view of the foregoing operation of the mechanism, it may be seen that within the range of operation of the brake motor, the brake shoes may be maintained in engagement with the brake drum no matter how much the drum expands. And by the same token, the brake is automatically restored to accurate adjusted condition following a severe brake application by merely depressing the brake pedal momentarily. Inasmuch as valve 43 may be forced open by a predetermined pressure in the fluid link, it is not possible to have the brake become locked as a result subsequent shrinkage of the drum following an over adjustment of the brake.

It may be noted that pressure-sensing valve 43 is operative to open in response to either a predetermined pressure in the inlet chamber 58, or a predetermined pressure of fluid in the outlet chamber 53 sufficient to overcome valve spring 50. Usually valve 43 is opened when the piston assembly 31 is bottomed by the pressure on the inlet side of the assembly 31 acting on marginal surfaces 52 of the valve 43 opposite groove 40 through passage 54. Whenever pressure of fluid in the outlet chamber 53 (i.e. the fluid link) reaches a predetermined value, however, this fluid can act directly on the central region of the valve 43 exposed through port 38 to force valve 43 open.

Figure 3:
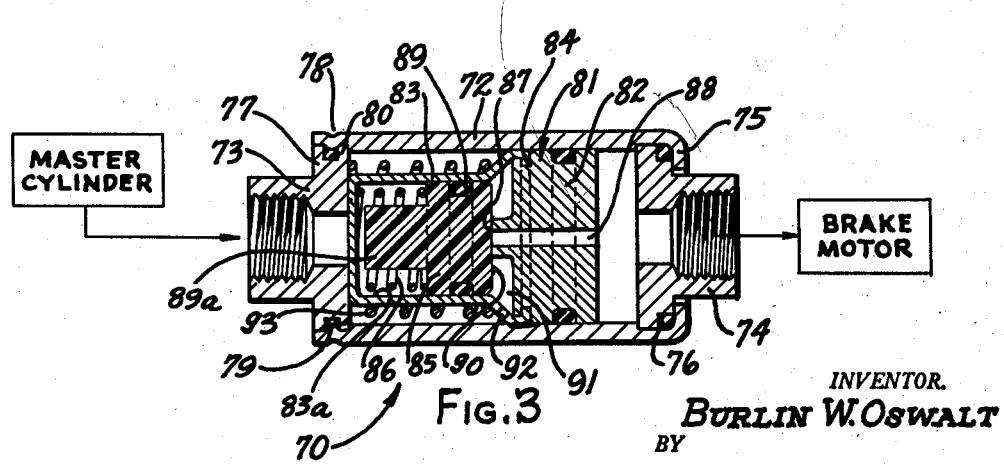
Fig. 3 is an axial cross-sectional view of another preferred form of adjusting mechanism, the view showing the condition of the adjuster mechanism when the brake is disengaged.

The adjuster mechanism 70 shown in Fig. 3 embodies the same combination of parts and has the same mode of operation as that shown in Figs. 1 and 2. The Fig. 3 species differs, however, in specific details of construction.

In the adjuster mechanism 70 of Fig. 3, the external casing of the mechanism is a cylindrical tube 72 which is closed at one end by an inlet fitting 73 and at its opposite end by an outlet fitting 74. Fittings 73 and 74 are the same shape and fit inside the ends of tube 72. The end 75 of the tube 72 embracing outlet fitting 74 is rolled over the annular flange portion of fitting 74 in pressure engagement with an annular gasket 76. The opposite end of tube 72 which embraces a flange portion 77 of inlet fitting 73 is rolled as at 78 inwardly against an annular gasket 79 in a V-shaped groove 80 extending around the periphery of flange 77. The inlet fitting 73 may be rolled into engagement with the tube 72 in the same manner as outlet fitting 74, or vice versa.

Inside the tube 72 there is a floating piston assembly 81 which includes a piston 82 having a bell-shaped metal tubular housing 83 secured to it and extending toward inlet fitting 73. The rim of housing 83 is rolled into engagement with an appropriately shaped annular rabbet 84 in piston 82.

The tubular housing 83 has installed therein a pressure-sensing valve 85 which is reciprocable in a bore 83a inside housing 83. The valve 85 is biased by a valve spring 86 toward a seat 87 surrounding a port 88 through piston 81. The valve 85 is preferably of a solid body of hard plastic material such as molded nylon or Teflon and is maintained in sealed sliding engagement with the housing 83 by a surrounding O-ring 89. The body of valve 85 includes a projection 89a extending toward the closed end of housing 83 which projection is embraced by valve spring 86 and is adapted to engage the closed end wall of housing 83 when the valve is fully opened.

The marginal region 90 of the forward face of valve 85 which extends radially beyond the portion fitting against seat 87 serves as a hydraulic actuating surface for the valve and this surface 90 is in communication with fluid in a channel 91 surrounding the valve seat 87 through a passage 92 in housing 83. Fluid entering tube 72 through the inlet fitting 73 fills the inlet side of tube 72 and is conducted through port 92 into channel 91 inside the housing between surface 90 of valve 85 and the rearward face of piston 82. The remaining space inside housing 83 behind pressure sensing-valve 85 where valve spring 86 is located is empty of actuating fluid.

The floating piston assembly 81 is biased forwardly toward a fluid link contained in tube 72 between outlet fitting 74 and assembly 81 by a main spring 93 which corresponds in function to spring 55 in the embodiment shown in Fig. 1.

Variations in the constructions disclosed may be made within the scope of the appended claims.

I claim:

1. Hydraulic adjusting mechanism comprising a casing having a bore therein, a main piston therein with a peripheral O-ring seal engaging the cylinder and a forward side adapted to communicate with fluid in the cylinder forming a fluid link with a fluid motor and said main piston having an opposing rearward side adapted to communicate with actuating fluid in the cylinder from a fluid pressure generator, said main piston being movable in said cylinder in response to fluid pressure force of actuating fluid through a predetermined stroke to displace a volume of fluid of said fluid link at said forward side equal to the displacement volume of the fluid motor associated therewith, a main spring biasing said main piston against said fluid link, a housing carried on the rearward side of said main piston and having a bore therein axial of the main piston and a closed end portion spaced from said piston, a port in said main piston connecting the bore of said housing with the forward side of said main piston, said port having a valve seat at the mouth of said port embraced by said housing, a pressure-sensing piston valve slidable in sealed engagement in said housing bore and having a face portion engageable with said valve seat to close said port, a valve spring inside said housing biasing said piston valve axially of said housing away from the closed end thereof and toward a position to engage and seal said face portion on said valve seat, an annular actuation surface on said piston valve concentric with said face portion inside said housing bore, said annular actuation surface and the adjoining surrounding portions of said housing and said piston defining an annular channel surrounding said valve seat when the valve is closed, and a passage through said housing opening into said channel to communicate actuating fluid from said rearward face of the piston to said channel, said piston valve being displaceable in its housing against the bias of its valve spring to open said port in response to a predetermined pressure of said fluid link acting through said port on said face portion of the valve, or in response to a predetermined pressure of fluid on said rearward face of the piston acting through said channel on said annular actuation surface.

2. Mechanism according to claim 1 in which said pressure-sensing piston valve is a cup-shaped body having a cylindrical open-ended side wall portion and a radial end wall portion, an O-ring surrounding said side wall portion; the valve being positioned in said bore with said valve spring seated inside said side wall portion and with said radial end wall portion directed toward said valve seat, a rubber sealing disc on said radial end wall portion to engage said valve seat, and said piston valve including portions of said radial end wall deformed inwardly about the peripheral margins of said disc to engage said disc and forming said actuation surfaces of said piston valve.

3. Mechanism according to claim 1 in which said main piston is formed with an annular rabbet adjacent the rearward side thereof, and said housing is a cup-shaped body with margins belled outwardly and in interlocked engagement with said rabbet in the piston, and said valve in said housing is a cylindrical-shaped solid plastic body, said valve having a portion projecting toward said closed end of the housing which portion is embraced by said valve spring and adapted to engage the end of the housing when the valve is fully open.

References Cited in the file of this patent

UNITED STATES PATENTS

| | | |
|---|---|---|
| 2,513,015 | Fike | June 27, 1950 |
| 2,727,715 | Tuthill | Dec. 20, 1955 |